United States Patent
Gotoh et al.

[11] Patent Number: 5,232,787
[45] Date of Patent: Aug. 3, 1993

[54] METHOD OF MAKING A PRESSURE SENSITIVE ADHESIVE TAPE OR SHEET

[75] Inventors: Masahiko Gotoh; Shigehisa Kobayashi, both of Saitama; Yasuhiko Ohyama, Osaka, all of Japan

[73] Assignee: Sekisui Chemical Co., Ltd., Osaka, Japan

[21] Appl. No.: 942,054

[22] Filed: Sep. 8, 1992

Related U.S. Application Data

[63] Continuation of Ser. No. 587,949, Sep. 25, 1990, abandoned.

[30] Foreign Application Priority Data

Jun. 8, 1990 [JP] Japan ............................ 2-150475
Jun. 20, 1990 [JP] Japan ............................ 2-162307

[51] Int. Cl.⁵ ............................................ B05D 5/10
[52] U.S. Cl. ................................. 428/523; 427/208.4; 427/208.8; 427/322
[58] Field of Search .................... 428/523; 427/208.4, 427/208.8, 322

[56] References Cited

U.S. PATENT DOCUMENTS

| | | | |
|---|---|---|---|
| 4,388,349 | 6/1983 | Korpman et al. | 427/208.4 |
| 4,397,905 | 8/1983 | Dettmer et al. | 428/343 X |
| 4,425,176 | 1/1984 | Shibano et al. | 156/289 X |
| 4,484,574 | 11/1984 | De Rusha et al. | 428/343 X |
| 4,536,441 | 8/1985 | Schmeer et al. | 428/343 X |
| 4,769,283 | 9/1988 | Sipinen et al. | 428/343 |
| 4,781,957 | 11/1988 | Brown et al. | 428/343 X |

FOREIGN PATENT DOCUMENTS 61-103975 5/1986 Japan .

OTHER PUBLICATIONS

"Morphological Study of the Wear of Crystalline Polymers", Wear, 75, by Tadashi Komoto et al., pp. 173–182, 1982.
ASTM D 1000 (Standard Methods of Testing Pressure-Sensitive Adhesive-Coated Tapes Used for Electrical Insulation), pp. 217 and 232.

*Primary Examiner*—Bernard Pianalto
*Attorney, Agent, or Firm*—Lowe, Price, LeBlanc & Becker

[57] ABSTRACT

Disclosed herein is a pressure sensitive adhesive tape or sheet comprising a base layer (substrate) formed of a polyolefin resin and a pressure sensitive adhesive layer laminated on one side of the base layer, optionally, through an intermediate layer. The pressure sensitive adhesive tape or sheet is characterized in that the back surface of the base layer has been applied with shearing force so as to subject it to a surface treatment and is improved in unwinding ability, namely, is capable of rerolling with small force when it is wound into a roll.

10 Claims, 1 Drawing Sheet

METHOD OF MAKING A PRESSURE SENSITIVE ADHESIVE TAPE OR SHEET

This application is a continuation application of application Ser. No. 07/587,949, filed Sep. 25, 1990 abandoned.

FIELD OF THE INVENTION

The present invention relates to a pressure sensitive adhesive tape or sheet comprising a base material formed of a polyolefin and a pressure sensitive adhesive layer formed thereon, and more specifically to a pressure sensitive adhesive tape or sheet, which is good in unwinding ability, i.e., is capable of rerolling with small force.

BACKGROUND OF THE INVENTION

Pressure sensitive adhesive tapes or sheets comprising a base material formed of a polyolefin and a pressure sensitive adhesive layer formed thereon are known. These pressure sensitive adhesive tapes or sheets are usually wound up in the form of a coil to form rolls as products.

In these rolls, the pressure sensitive adhesive as an upper layer closely adheres to the back surface of the base layer (substrate) as a lower layer under relatively strong adhesion. It is hence difficult to unwind or peel off the wound tape or sheet for use as things are. Therefore, the back surface of the base layer has generally been subjected to a so-called releasability-imparting treatment so as to permit easy unwinding of the pressure sensitive adhesive tape or sheet without undergoing the migration to the opposite side (the back surface of the base layer) and blocking of the pressure sensitive adhesive, and the delamination of the base material upon its unwinding.

As such a releasability-imparting treatment, it has widely been used to date to apply a release agent to the back surface of a base layer in advance. It is however difficult to control contradictory properties that the release agent is caused to firmly adhere to the base layer, but made liable to suitably separate from the pressure sensitive adhesive layer. Therefore, it is necessary to use a specific release agent, to coat with a primer, or to be subjected to a corona discharge treatment prior to the coating of the release agent.

As exemplary release agents used generally, may be mentioned linear alkyl-containing polymer (for example, polyvinyl ester allylcarbamates), silicone polymers and perfluoro hydrocarbon polymers. These release agents cause the increase of the cost of materials and also the production cost because of the required complex coating process. .Moreover, even after producing the pressure sensitive adhesive tape or sheet, there is a problem in quality aspect that the release agent migrates to the pressure sensitive adhesive layer, thereby causing the reduction of its adhesion.

By the way, it is proposed in Japanese Patent Application Laid-Open No. 103975/1986 to simultaneously form and laminate a base layer and a pressure sensitive adhesive layer by a co-extrusion technique though it is in a surface protective film. According to this method, the process is simplified and the adhesion properties between the base layer and the pressure sensitive adhesive are improved. It is also paid attention as an excellent technique from the viewpoint of quality. However, in this case, it is also necessary to subject the back surface of the base layer to a releasability-imparting treatment in order to impart good unwinding ability to the protective film, because of the strong adhesion of the pressure sensitive adhesive to the base layer. The co-extrusion technique however fails to subject the back surface of the base layer to the releasability-imparting treatment in advance. This technique is hence accompanied by a more serious problem in that the restriction of season is imposed on the releasability-imparting treatment.

OBJECT AND SUMMARY OF THE INVENTION

It is an object of this invention is to provide a pressure sensitive adhesive tape or sheet, which is good in unwinding ability, namely, is capable of rerolling with small force, capable of rerolling with small force over a long period of time and also does not adversely affect in the quality aspect, by a simple process without using any release agents.

The present inventors have carried out an extensive investigation with a view toward overcoming the problems involved in the above prior art. As a result, it has been found that when sliding friction attributing to, for example, the contact against a solid substance is caused to occur on one side of a base material formed of a polyolefin to apply shearing force thereto, the fine configuration and/or crystalline morphology of the surface are changed, so that when a pressure sensitive adhesive tape or sheet containing, as a back surface, the surface-treated surface described above is wound up into a roll, force required for its unrolling is reduced to a significant extent, namely, its unwinding ability is remarkably improved and moreover, the force required for its unrolling and the initial adhesion of the pressure sensitive adhesive layer are not changed as the time goes on. The present invention has been led to completion on the basis of these findings.

According to the present invention, there is thus provided a pressure sensitive adhesive tape or sheet comprising a base layer (substrate) formed of a polyolefin and a pressure sensitive adhesive layer laminated on one side of the base layer, optionally, through an intermediate layer, characterized in that the back surface of the base layer has been applied with shearing force so as to subject it to a surface treatment.

DETAILED DESCRIPTION OF THE INVENTION

Figure 1:
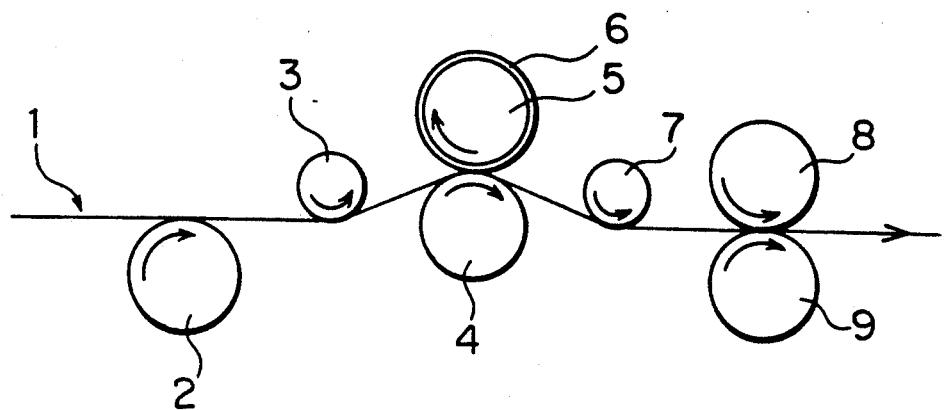
FIG. 1 is a schematic cross-sectional view illustrating one embodiment for applying shearing force to the back surface of a base layer of a pressure sensitive adhesive tape.

Features of the present invention will hereinafter be described in detail.

As exemplary polyolefin resins suitable for use in forming the base layer (substrate) in this invention, may be mentioned polyethylene, polypropylene, copolymers such as ethylene-vinyl acetate copolymers and ethylene-ethyl acrylate copolymers, and mixture thereof.

The polyolefin tape or sheet constituting the base layer may be unstretched, uniaxially stretched or multiaxially stretched.

In this invention, the pressure sensitive adhesive layer is a layer having tackiness and is formed with a pressure sensitive adhesive or an adhesive having tackiness.

As the pressure sensitive adhesive or the adhesive, may be used, for example, rubber- (including thermoplastic elastomers), acrylic-, urethane- and silicone-based pressure sensitive adhesives, which have heretofore been known as pressure sensitive adhesives, and ethylene-vinyl acetate copolymer-based adhesives. Usually, these pressure sensitive adhesives are composed of an elastomer, and a tackifying resin, softener, filler, age resistor and others which are suitably added to the elastomer.

In this invention, an intermediate layer may be provided between the base layer and the pressure sensitive adhesive layer. As materials for the intermediate layer, may suitably be used kraft paper, fabric, synthetic resins and the like, which have been all used as base materials for conventional pressure sensitive adhesive tapes or sheets. Namely, these intermediate layers separately form a base layer together with the polyolefin resin layer.

Incidentally, antioxidant, ultraviolet absorber, light stabilizer, pigment, etc. may be suitably added to the base layer and the pressure sensitive adhesive layer.

The thickness of each layer may be suitably preset as necessary for the end application intended. In general, the thicknesses of the base layer and the pressure sensitive adhesive layer are about 10-500 μm and about 5-100 μm, respectively.

No particular limitation is imposed on the season for the surface treatment for applying shearing force to the back surface of the base layer. It is however necessary to conduct the surface treatment prior to the winding of the pressure sensitive adhesive tape or sheet into a roll. It is desirable from a consideration of productivity and the like that the base material alone should be subjected to the surface treatment prior to the lamination of the base material on the pressure sensitive adhesive layer, or the back surface of the base layer should be subjected to the surface treatment after the lamination of the base material on the pressure sensitive adhesive layer, but before the winding of the pressure sensitive adhesive tape or sheet. In particular, when using the co-extrusion technique, it is preferable to conduct the surface treatment of the back surface of the base layer after the formation and lamination of the base material and pressure sensitive adhesive layers by co-extrusion.

As the surface treatment for applying the shearing force to the back surface of the base layer, may be mentioned, for example, a method wherein shearing force is applied in a direction parallel or perpendicular to the flowing direction of the base material sheet by a technique in which the surface of the base material is physically rubbed with a solid substance.

The process for the production of a pressure sensitive adhesive tape or sheet (hereinafter referred to as a "pressure sensitive adhesive sheet") generally includes a step causing to pass through a series of rolls. It is therefore considered that a roll-like solid substance (hereinafter may simply referred to as a "roll") is used as the solid substance.

No particular limitation is imposed on the material for the roll. Such rolls may include, for example, rolls with fibers or a fibrous formed product (for example, gauze, fabric or the like) wrapped around a metal-made roll and metal-made rolls whose surfaces have a coefficient of sliding friction of 0.3-0.9 against the polyolefin-made base material. As exemplary metal-made rolls, may be mentioned a roll made of a stainless steel and plated rolls. The surface layer of the roll may also be formed by, for example, paper, rubber, a synthetic resin film or the like. In this case, only the material of the surface layer of the roll is important, but any materials may be used as materials for other portions.

No particular limitation is imposed on the method of applying the shearing force to the back surface of the base layer making use of the roll. It is possible to apply the shearing force to the back surface of the base layer by, for example, rotating the roll in the direction opposite or identical to the flowing direction of the pressure sensitive adhesive sheet, or fixing the roll without rotating.

Specific processes and apparatus for applying shearing force to the back surface of the base layer will be described with reference to FIGS. 1 and 2.

FIG. 1 is a schematic cross-sectional view illustrating one embodiment for applying shearing force to the back surface of a base layer of a pressure sensitive adhesive sheet.

In FIG. 1, numeral 1 indicates a pressure sensitive adhesive sheet with a pressure sensitive adhesive layer laminated on one side of a polyolefin base layer. The direction of the arrow 1 (the upper side) represents the back surface of the base layer. The pressure sensitive adhesive sheet 1 which has been produced in the previous process is wound up in the form of a coil to form a roll. In the previous stage, the pressure sensitive adhesive sheet 1 is caused to pass through a series of rolls. The pressure sensitive adhesive sheet 1 is brought, through a guide roll, into contact with fibers or fibrous formed product 6 wrapped around a counterrotating roll 5 displaced on a roll 4, so that sliding friction is caused to occur between the back surface of the base layer and the fibers or fibrous formed product 6 to apply shearing force to the back surface of the base layer. Rolls 3, 7 are arranged before and after the counterrotating roll 5, respectively, to apply tension to the pressure sensitive adhesive sheet 1. The pressure sensitive adhesive sheet 1 thus sulfate-treated is caused to pass through between pinch rolls 8 and 9, followed by its winding into a roll.

As the roll 5, may be used a forward roll rotating in the same direction as the flowing direction of the pressure sensitive adhesive sheet 1. When the roll 5 is rotated in the flowing direction, the rotating speed (roll speed) of the roll 5 is usually controlled faster than the flow speed (line speed) of the pressure sensitive adhesive sheet 1. Alternatively, the roll 5 may be fixed without rotating. Further, the surface layer of the roll 5 may be formed with a metal, paper, rubber, synthetic resin film or the like.

Figure 2:
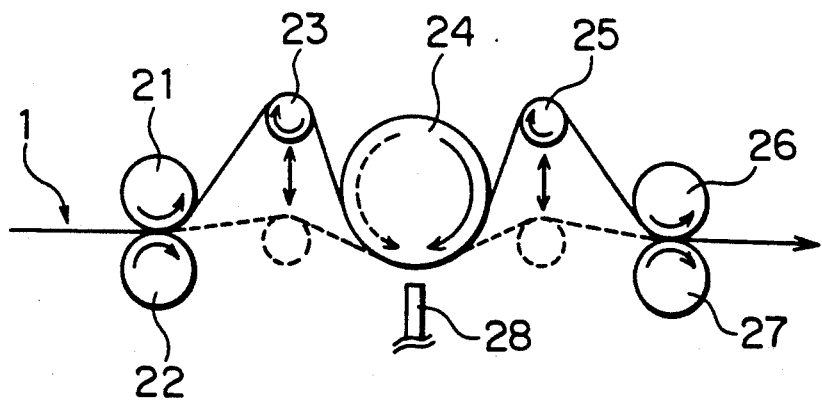
FIG. 2 is a schematic cross-sectional view illustrating another embodiment.

FIG. 2 is a schematic cross-sectional view illustrating another embodiment for applying shearing force to the back surface of a base layer by causing the pressure sensitive adhesive sheet 1, which has been produced in the previous process, to path through a series of rolls in the similar manner to that in FIG. 1.

The pressure sensitive adhesive sheet 1 is caused to pass through between pinch rolls 21, 22 and then brought into contact with a counterrotating roll (or a forward roll) 24 while applying tension thereto by left and right turn rolls 23, 25, thereby causing sliding friction to occur between the back surface of the base layer and the counterrotating roll 24. The pressure sensitive adhesive sheet 1 is then caused to pass through between pinch rolls 26, 27, followed by its winding into a roll. The first pinch rolls 21, 22 are not necessarily disposed. However, it is generally preferable to arrange them because frictional force is applied in the direction opposite to the flowing direction of the pressure sensitive adhesive sheet 1 when the roll 24 is used as a counterrotating roll, so that the pressure sensitive adhesive sheet 1 is loosened and it is difficult to apply desired tension thereto. It is also desirable that the delivery speed of the pinch rolls 21, 22 with respect to the pressure sensitive adhesive sheet 1 should be controlled somewhat slower than the usual flow speed of the pressure sensitive adhesive sheet 1 so as to apply tension to the pressure sensitive adhesive sheet 1. Alternatively, the pinch rolls 21, 22 may also be changed to a dancer roll capable of applying constant tension to the pressure sensitive adhesive sheet 1.

The turn rolls 23, 25 are provided so as to be movable vertically in parallel with each other, thereby controlling the tension applied to the pressure sensitive adhesive sheet 1 or the contact area between the roll 24 and the back surface of the base layer in the pressure sensitive adhesive sheet 1.

The roll 24 may be used as a forward or fixed roll. The roll 24 may be made of a metal or provided with a layer such as fibers or a fibrous formed product, paper, rubber and a synthetic film on the surface thereof.

In FIG. 2, numeral 28 designates a blow nozzle of a gas (air or the like). By applying a gas stream at a pressure of 1–50 kg/cm$^2$ to the portion of the back surface of the base layer, to which shearing force is to be applied, if desired, it is possible to apply additional sliding frictional force caused by the gas pressure, in addition to the sliding frictional force caused by the tension and rotational force.

By the way, the structure of the roll 5 or 24 is not necessarily in the form of a cylinder. It is only necessary for the roll to have a structure that it is free of any projections at the portion where the back surface of the base layer of the pressure sensitive adhesive sheet 1 contacts, so that the pressure sensitive adhesive sheet 1 can slide thereon without being caught. For example, the roll may be in the form of a semi-circle in section when it is used as a fixed roll.

These shearing force-imparting means may be used either singly or in suitable combination with another or other ones.

In this invention, the reason why a releasability-imparting effect (unrolling force-improving effect) is given to the back surface of the base layer by applying the shearing force to the back surface to treat the surface is considered as follows.

The base layer is usually produced by using a polyolefin as a raw material and extruding the raw material through an extruder in accordance with the inflation or T-die method. It is generally known that in the cooling process of the molten resin extruded in the form of a tube or sheet in such a manner, crystals are formed on the surface of the thus-produced base layer, whereby crystallized portions and uncrystallized portions generate on the base layer. The proportion of the crystallized portions can be expressed in terms of crystallinity.

It is known from the report by Komoto et al. that when shearing force is applied to the surface of polyethylene or polypropylene, the crystallographic morphology of its surface is changed [Wear, 75, 173–812 (1982)].

When the unwinding force (force required for rerolling) of a roll of a pressure sensitive adhesive sheet was great, namely, for example, the force required for rerolling was 1,000 gf/50 mm as measured at a unwinding speed of 30 m/min, the surface of the base layer after unwound was observed to investigate its condition. As a result, it was confirmed that its surface morphology is changed to a great extent. This morphological change is closely similar to the case where the shearing force was applied to the surface of the base layer.

As one reason why the force required for rerolling of the roll is great as described above, may be mentioned the fact that the unwinding requires force by which the morphology in the back surface of the base layer is changed. If shearing force is applied to the surface of the base layer to change the morphology of the surface in advance, the force required for such change becomes needless. As a result, it can be considered that the force required for rerolling is reduced.

The shearing force to be applied to the back surface of the base layer should be generally limited to a range in which the polyolefin resin sheet as a base material does not undergo deformation such as neck-in. In the surface treatment of the base material, the work load to be done by the shearing force is 10 J or more. If the work load should be less than 10 J, the force required for rerolling will be not reduced sufficiently and there is a potential problem that the force required for rerolling is increased as the temperature changes and the time goes on.

In some cases, for example, when shearing force is applied to the back surface of the base layer by bringing the back surface into contact with a roll with nylon fabric wrapped on its surface, parallel stripes are formed in the flowing direction (longitudinal direction) of the base layer. In this case, the interval between the parallel stripes is generally about 5–20 $\mu$m, preferably about 7–15 $\mu$m.

When shearing force is applied to the back surface of the base layer making use of a roll, the control of the shearing force is effected by tension applied to the pressure sensitive adhesive sheet. The sliding frictional force caused by the drag which generates together with the tension between the roll and the pressure sensitive adhesive sheet acts as shearing force. However, if the tension applied to the pressure sensitive adhesive sheet should be too great, the sheet will generally be deformed. Accordingly, by applying a gas stream, generally, an air stream at a pressure of 1–50 kg/cm$^2$ to the portion of the back surface of the base layer, to which shearing force is to be applied, additional sliding frictional force caused by the air pressure is provided in addition to the sliding frictional force caused by the tension, whereby shearing force can be given without deforming the pressure sensitive adhesive sheet. Any air pressures lower than 1 kg/cm$^2$ will be too low to give sufficient sliding frictional force. Any air pressures higher than 50 kg/cm$^2$ will result in a deformed pressure sensitive adhesive sheet. The air pressure is preferably 3–20 kg/cm$^2$ with 5–15 kg/cm$^2$ being more preferred.

ADVANTAGES OF THE INVENTION

In the pressure sensitive adhesive sheet according to this invention, any release agents are not used. Therefore, its production process can be simplified and made a in-line system because the process required for the releasability-imparting treatment is also simple. In addition, the pressure sensitive adhesive sheet is good in unwinding ability with time, can maintain its good releasability over a long period of time and also does not adversely affect in the quality aspect such that the surfaces of any adherends are not stained.

EMBODIMENTS OF THE INVENTION

The present invention will hereinafter be described specifically by the following examples. It should be borne in mind that this invention is not limited to the following examples only.

EXAMPLE 1

A pressure sensitive adhesive solution (solids concentration: 40%) obtained by uniformly dissolving a mixture of 100 parts by weight of a styrene-butadiene-styrene block copolymer ("Califlex TR1102", trade name; product of Shell Kagaku K. K.) and 100 parts by weight of a tackifying resin ("CLEARON P100", trade name; product of Yasuhara Yushi Kogyo Co., Ltd.) in toluene was coated on one side of a polyethylene ("Hi-zex 3300F", trade name; product of Mitsui Petrochemical Industries, Ltd.) sheet formed by the inflation method and having a thickness of 100 μm to give a thickness of 40 μm in terms of solids, and the dried. Successively, shearing force was applied to the back surface opposite to the coated surface of the thus-obtained pressure sensitive adhesive sheet by a counterrotating roll 24 with nylon fabric wrapped thereon as illustrated in FIG. 2. The thus-treated sheet was caused to pass through between pinch rolls 26, 27 to wind up on a paper core having an internal diameter of 3 inches into a roll.

With respect to conditions for applying the shearing force, the flow speed (line speed) of the sheet was 10 m/min, the surface speed (roll speed) of the counterrotating roll 24 was 90 m/min, and the tension applied to the sheet was 8 kg/m.

EXAMPLE 2

A roll was produced by treating in the same manner as in Example 1 except that a pressure sensitive adhesive sheet was obtained by using the same polyethylene as that employed in Example 1 and the same pressure sensitive adhesive components (toluene was not used) as that employed in Example 1 and co-extruding both components in accordance with the T-die method.

EXAMPLE 3

Polyethylene ("Mirason 16", trade name; product of Mitsui Petrochemical Industries, Ltd.) was extruded to a thickness of 15 μm on one side of kraft paper to laminate them. The same pressure sensitive adhesive components (toluene was not used) as that employed in Example 1 were melted under heating and coated on the surface opposite to the polyethylene side, thereby forming a pressure sensitive adhesive layer having a thickness of 40 μm.

Successively, shearing force was applied to the back surface opposite to the coated surface of the thus-obtained pressure sensitive adhesive sheet by a forward roll 24 as illustrated in FIG. 2. The thus-treated sheet was caused to pass through between pinch rolls 26, 27 to wind up on a paper core having an internal diameter of 3 inches into a roll.

With respect to conditions for applying the shearing force, the line speed of the sheet was 10 m/min, the roll speed of the forward roll 24 was 110 m/min, the tension applied to the sheet was 20 kg/m, and the coefficient of sliding friction between metal roll 24 and the sheet was 0.7.

COMPARATIVE EXAMPLE 1

A roll was produced in the same manner as in Example 2 except that the shearing force was not applied.

EXAMPLE 4

A pressure sensitive adhesive solution (solids concentration: 20%) obtained by uniformly dissolving a mixture of 100 parts by weight of a hydrogenated styrene-butadiene-styrene block copolymer ("Kraton G1652", trade name; product of Shell Kagaku K. K.) and 100 parts by weight of a tackifying resin ("CLEARON P100", trade name; product of Yasuhara Yushi Kogyo Co., Ltd.) in toluene was coated on one side of a polyethylene ("Mirason 16", trade name; product of Mitsui Petrochemical Industries, Ltd.) sheet formed by the inflation method and having a thickness of 60 μm to give a thickness of 10 μm in terms of solids, and the dried. Successively, shearing force was applied to the back surface opposite to the coated surface of the thus-obtained pressure sensitive adhesive sheet by a counterrotating roll 24 with nylon fabric wrapped thereon as illustrated in FIG. 2. The thus-treated sheet was caused to pass through between pinch rolls 26, 27 to wind up on a paper core having an internal diameter of 3 inches into a roll. The shearing force was applied under the same conditions as in Example 1.

EXAMPLE 5

A roll was produced in the same manner as in Example 4 except that a pressure sensitive adhesive sheet was obtained by using the same polyethylene as that employed in Example 4 and the same pressure sensitive adhesive components (toluene was not used) as that employed in Example 4 and co-extruding both components in accordance with the T-die method.

COMPARATIVE EXAMPLE 2

A roll was produced in the same manner as in Example 5 except that the shearing force was not applied.

EXAMPLE 6

The same procedure as in Example 5 was repeated until the co-extrusion in accordance with the T-die method. With respect to conditions for applying the shearing force, the line speed of the sheet was 10 m/min, the roll speed of the counterrotating roll 24 was 40 m/min, the tension applied to the sheet was 4 kg/m, and an air stream at a pressure of 10 kg/cm² was blown perpendicularly against the portion of the pressure sensitive adhesive sheet, to which the shearing force was to be applied, through a gas blow nozzle 28 illustrated in FIG. 2.

Results of the measurements in the above examples and comparative examples are shown collectively in Table 1.

TABLE 1

| | Aging after winding | | Force required for rerolling (g/50 mm) | Initial adhesion (g/50 mm) |
|---|---|---|---|---|
| | Temperature (°C.) | Time (hr) | | |
| Ex. 1 | 23 | 100 | 220 | 1900 |
| | 40 | 100 | 260 | 1900 |
| | 60 | 100 | 260 | 1900 |
| Ex. 2 | 23 | 100 | 220 | 1750 |
| | 40 | 100 | 260 | 1750 |
| | 60 | 100 | 260 | 1750 |
| Ex. 3 | 23 | 100 | 280 | 1630 |
| | 40 | 100 | 300 | 1630 |

TABLE 1-continued

| | Aging after winding | | Force required for rerolling (g/50 mm) | Initial adhesion (g/50 mm) |
|---|---|---|---|---|
| | Temperature (°C.) | Time (hr) | | |
| | 60 | 100 | 300 | 1630 |
| Comp. | 40 | 24 | 850*1 | —*2 |
| Ex. 1 | 40 | 100 | 1030*1 | —*2 |
| | 60 | 24 | 1890*1 | —*2 |
| Ex. 4 | 23 | 100 | 180 | 400 |
| | 40 | 100 | 200 | 400 |
| | 60 | 100 | 200 | 400 |
| Ex. 5 | 23 | 100 | 180 | 380 |
| | 40 | 100 | 200 | 360 |
| | 60 | 100 | 200 | 360 |
| Comp. | 40 | 24 | 820*1 | —*2 |
| Ex. 2 | 40 | 100 | 2230*1 | —*2 |
| | 60 | 24 | 2670*1 | —*2 |
| Ex. 6 | 23 | 100 | 180 | 380 |
| | 40 | 100 | 200 | 360 |
| | 60 | 100 | 200 | 360 |

*1The sheet was stretched and deformed.
*2Unmeasurable due to its impossible unwinding.

Incidentally, the measuring methods of the above physical properties are as follows:

AGING AFTER WINDING

After winding each pressure sensitive adhesive sheet into a roll, it was left to stand respectively under three combined conditions given in Table 1 to measure its force required for rerolling and initial adhesion.

FORCE REQUIRED FOR REROLLING

The force required for rerolling of each roll was expressed in terms of the reduced value of g/50 mm wide to the force required to unwind the pressure sensitive adhesive sheet from the roll at a rate of 30 m/min.

INITIAL ADHESION

The initial adhesion was expressed in terms of the reduced value of g/50 mm wide to the force required to stick the pressure sensitive adhesive sheet unwound from each roll on stainless steel plate prescribed in JIS Z 0237 by a laminator, leave the laminate to stand for 30 minute at 23° C. and then peel the adhesive sheet from the steel plate at a rate of 300 mm/min and an angle of 180°.

It is appreciated from Table 1 that in Examples 1-6 according to this invention, each pressure sensitive adhesive sheet is neither stretched nor deformed upon peeling it from the roll in the practical temperature range after winding it into the roll and the initial adhesion after the peeling does not also change. On the other hand, it is understood that the pressure sensitive adhesive sheets according to Comparative Examples 1-2 increase their force required for rerolling as the time goes on, so that they are stretched and deformed upon peeling them from the respective rolls and hence cannot be substantially used.

We claim:

1. A method of making a pressure sensitive adhesive tape or sheet which comprises:
providing a base layer formed of a polyolefin resin and having first and second opposed surfaces;
applying a pressure sensitive adhesive layer on one of said first and second surfaces of said base layer; and
bring the other of said first and second surfaces of said base layer into contact with a solid substrate surface to cause sliding friction to occur therebetween thereby applying a shearing force to the other of said first and second surface of said base layer, said shearing force being of a magnitude which is sufficient to physically impart release characteristics to the other of said first and second surfaces of said base layer.

2. A method of making a pressure sensitive adhesive tape or sheet according to claim 1, wherein said substrate surface comprises a surface of a roller.

3. A method of making a pressure sensitive adhesive tape or sheet according to claim 2, wherein said surface of said surface of said roller is formed of fibers or a fibrous formed product.

4. A method of making a pressure sensitive adhesive tape or sheet according to claim 2, wherein said surface of said roller is formed of a metal.

5. A method of making a pressure sensitive adhesive tape or sheet according to claim 4, wherein the coefficient of sliding friction between the metal surface of said roller and said base layer is from about 0.3 to 0.9.

6. A method of making a pressure sensitive adhesive tape or sheet according to claim 1, wherein said shearing force is applied to the other of said first and second surfaces of said base layer by bridging a surface of at least one of a counterrotating roll-shaped solid substance, a forward rotating roll-shaped solid substance and a fixed roll-shaped solid substance, all with respect to a direction of movement of the base material, with said base layer so as to cause sliding friction to occur to said base layer.

7. A method of making a pressure sensitive adhesive tape or sheet according to claim 1, wherein said shearing force is applied to the other of said first and second surfaces of said base layer by causing sliding friction to occur between the base layer and the solid substrate surface while applying a gas stream at a pressure of 1-50 kg/cm$^2$ to a portion of the base layer, which contacts with the solid substrate surface.

8. A method of making a pressure sensitive adhesive tape or sheet according to claim 7, wherein said gas stream comprises a stream of air.

9. A method of making a pressure sensitive adhesive tape or sheet according to claim 1, wherein said shearing force is applied to the other of said first and second surfaces of said base layer prior to applying said pressure sensitive adhesive layer on said one or said first and second surfaces of said base layer.

10. A pressure sensitive adhesive tape or sheet produced by the method of claim 1.

* * * * *